United States Patent
Dimitrov

(10) Patent No.: US 10,742,320 B2
(45) Date of Patent: Aug. 11, 2020

(54) METHOD FOR TRANSMITTING A BINARY DATA SIGNAL TO OR FROM A SATELLITE VIA AN OPTICAL FEEDER LINK

(71) Applicant: Deutsches Zentrum für Luft- und Raumfahrt e.V., Cologne (DE)

(72) Inventor: Svilen Dimitrov, Munich (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 16/743,731

(22) Filed: Jan. 15, 2020

(65) Prior Publication Data

US 2020/0153508 A1      May 14, 2020

Related U.S. Application Data

(62) Division of application No. 15/661,226, filed on Jul. 27, 2017, now Pat. No. 10,574,355.

(30) Foreign Application Priority Data

Jul. 27, 2016    (DE) ........................ 10 2016 213 764

(51) Int. Cl.
     *H04B 10/118*      (2013.01)
     *H04J 14/02*      (2006.01)
     (Continued)

(52) U.S. Cl.
     CPC ............ *H04B 10/118* (2013.01); *H04J 14/02* (2013.01); *H04J 14/0278* (2013.01); *H04B 10/516* (2013.01); *H04B 10/60* (2013.01)

(58) Field of Classification Search
     CPC .... H04B 10/118; H04B 10/516; H04B 10/60; H04B 7/1851; H04J 14/02; H04J 14/0278
(Continued)

(56) References Cited

U.S. PATENT DOCUMENTS

| | | | |
|---|---|---|---|
| 3,789,142 A | | 1/1974 | Shimasaki |
| 4,928,317 A | * | 5/1990 | Franchini ............... H04B 10/11 |
| | | | 398/119 |

(Continued)

FOREIGN PATENT DOCUMENTS

| | | |
|---|---|---|
| EP | 0863627 A1 | 9/1998 |
| WO | 0184451 A2 | 11/2001 |
| WO | 03084118 A1 | 10/2003 |

OTHER PUBLICATIONS

"ICT-2011.1.1 BATS D4.1: Satellite Network Mission Requirements", Broadband Access via Integrated Terrestrial and Satellite Systems (BATS) European Project, Tech. Rep., 2012., 166 pgs.

(Continued)

*Primary Examiner* — Dibson J Sanchez
(74) *Attorney, Agent, or Firm* — Maier & Maier, PLLC

(57) ABSTRACT

A method for transmitting a binary data signal to or from a satellite via an optical feeder link, wherein an optical transmitting interface carries out the following steps multiplexing binary physical layer frames which are associated with a plurality of carriers or a plurality of beams in a satellite communication system into a single bit stream, inserting a binary physical layer frame identification sequence upstream of each physical layer frame, wherein the physical layer frame identification sequence comprises: a unique binary synchronization sequence, a binary beam index sequence, a binary carrier frequency index sequence, a binary baud rate index sequence, a binary roll-off factor index sequence, a binary modulation index sequence.

5 Claims, 5 Drawing Sheets

(51) Int. Cl.
*H04B 10/516* (2013.01)
*H04B 10/60* (2013.01)

(58) Field of Classification Search
USPC .................................. 398/43–103, 118–131
See application file for complete search history.

(56) References Cited

U.S. PATENT DOCUMENTS

| | | | |
|---|---|---|---|
| 5,563,606 A | 10/1996 | Wang | |
| 5,596,315 A | 1/1997 | Olds | |
| 5,661,582 A | 8/1997 | Kintis | |
| 5,898,680 A | 4/1999 | Johnstone | |
| 6,125,261 A * | 9/2000 | Anselmo | H04B 7/18578 |
| | | | 370/316 |
| 6,181,450 B1 | 1/2001 | Dishman | |
| 6,185,265 B1 | 2/2001 | Campanella | |
| 6,201,798 B1 | 3/2001 | Campanella | |
| 6,222,658 B1 | 4/2001 | Dishman | |
| 6,271,953 B1 | 8/2001 | Dishman | |
| 6,556,324 B1 * | 4/2003 | Meier | H04B 10/118 |
| | | | 398/121 |
| 6,868,072 B1 | 3/2005 | Lin | |
| 6,912,075 B1 | 6/2005 | Ionov | |
| 7,142,566 B1 | 11/2006 | Leyn et al. | |
| 7,324,465 B2 | 1/2008 | Lim | |
| 7,995,515 B2 | 8/2011 | Thesling | |
| 8,989,586 B2 * | 3/2015 | Arnold | 370/316 |
| 9,954,601 B2 * | 4/2018 | Buer | H04B 7/18508 |
| 10,069,565 B2 | 9/2018 | Gallagher | |
| 10,128,578 B2 * | 11/2018 | Hreha | H04B 7/043 |
| 10,250,330 B1 | 4/2019 | Cabello | |
| 10,432,308 B1 * | 10/2019 | Turgeon | H04B 7/18521 |
| 2002/0105976 A1 | 8/2002 | Kelly | |
| 2004/0097192 A1 | 5/2004 | Schiff | |
| 2005/0100339 A1 * | 5/2005 | Tegge, Jr. | H04B 10/118 |
| | | | 398/125 |
| 2005/0249501 A1 | 11/2005 | Wolcott | |
| 2006/0040612 A1 | 2/2006 | Min | |
| 2008/0002981 A1 | 1/2008 | Valley | |
| 2008/0051080 A1 * | 2/2008 | Walker | H04B 7/2041 |
| | | | 455/427 |
| 2008/0060021 A1 | 3/2008 | Basse | |
| 2008/0181108 A1 | 7/2008 | Hashmi | |
| 2009/0023384 A1 * | 1/2009 | Miller | H04B 7/2041 |
| | | | 455/12.1 |
| 2010/0017826 A1 | 1/2010 | Fitting | |
| 2010/0046415 A1 | 2/2010 | Kim | |
| 2010/0159861 A1 | 6/2010 | Becker | |
| 2010/0226426 A1 * | 9/2010 | Tupala | H04H 20/72 |
| | | | 375/240.01 |
| 2010/0272190 A1 | 10/2010 | Kim | |
| 2011/0176603 A1 * | 7/2011 | Beeler | H04L 1/0003 |
| | | | 375/240.02 |
| 2011/0188550 A1 | 8/2011 | Wajcer | |
| 2011/0274429 A1 * | 11/2011 | Caplan | E21B 49/00 |
| | | | 398/65 |
| 2012/0294230 A1 | 11/2012 | Dankberg | |
| 2012/0314762 A1 * | 12/2012 | Herrmann | H04N 21/4305 |
| | | | 375/240.02 |
| 2013/0195148 A1 | 8/2013 | Kim | |
| 2013/0246883 A1 * | 9/2013 | Shinya | H04L 1/0057 |
| | | | 714/752 |
| 2013/0336661 A1 * | 12/2013 | Chorvalli | H04B 10/118 |
| | | | 398/119 |
| 2014/0016941 A1 * | 1/2014 | Coleman | H04B 7/18521 |
| | | | 398/121 |
| 2014/0079160 A1 | 3/2014 | Beidas | |
| 2014/0082675 A1 * | 3/2014 | Kim | H04L 27/2601 |
| | | | 725/64 |
| 2014/0226682 A1 | 8/2014 | Becker | |
| 2014/0341118 A1 * | 11/2014 | Lee | H04W 72/04 |
| | | | 370/329 |
| 2014/0362875 A1 | 12/2014 | Le Kernec | |
| 2015/0074485 A1 * | 3/2015 | Jeong | H03M 13/6516 |
| | | | 714/755 |
| 2015/0082132 A1 * | 3/2015 | Jeong | H03M 13/2906 |
| | | | 714/776 |
| 2015/0110491 A1 | 4/2015 | Gayrard | |
| 2015/0156141 A1 | 6/2015 | Michael | |
| 2015/0189486 A1 * | 7/2015 | Lee | H04W 4/80 |
| | | | 370/259 |
| 2015/0381392 A1 | 12/2015 | Beidas | |
| 2016/0043800 A1 * | 2/2016 | Kingsbury | H04B 7/18517 |
| | | | 398/125 |
| 2016/0087747 A1 | 3/2016 | Way | |
| 2016/0182189 A1 | 6/2016 | Stadali | |
| 2016/0204861 A1 | 7/2016 | Boroson et al. | |
| 2016/0204866 A1 | 7/2016 | Boroson | |
| 2017/0093539 A1 * | 3/2017 | Wang | H04B 7/18506 |
| 2017/0141906 A1 | 5/2017 | Rainish | |
| 2017/0149493 A1 | 5/2017 | Arapoglou | |
| 2017/0223769 A1 * | 8/2017 | Takahashi | H04J 3/0697 |
| 2017/0288769 A1 * | 10/2017 | Miller | H04B 7/18515 |
| 2017/0324468 A1 | 11/2017 | Lee | |
| 2017/0339453 A1 * | 11/2017 | Kwon | H04L 65/608 |
| 2017/0366263 A1 | 12/2017 | Turgeon | |
| 2018/0019816 A1 | 1/2018 | Wang | |
| 2018/0069629 A1 | 3/2018 | Turgeon | |
| 2019/0068282 A1 | 2/2019 | Neuman | |
| 2019/0280772 A1 | 9/2019 | Boroson | |

OTHER PUBLICATIONS

"Optimised Smart Gateway Diversity for BATS", Broadband Access via Integrated Terrestrial and Satellite Systems (BATS) European Project, BATS Factsheet 8, May 2014., 2 pgs.
Second Generation Framing Structure, Channel Coding and Modulation Systems for Broadcasting, Interactive Services, News Gathering and Other Broadband Satellite Applications; Part II: S2-Extensions (DVBS2X), Digital Video Broad-casting (DVB) Std. ETSI EN 302 307-2, Oct. 2014., 139 pgs.
Implementation Guidelines for the Second Generation System for Broadcasting, Interactive Services, News Gathering and Other Broadband Satellite Applica-tions; Part II: S2-Extensions (DVB-S2X), Digital Video Broadcasting (DVB) Std. ETSI TR 102 376-2, Mar. 2015., 183 pgs.
Xuegui Song et al., "A source routing algorithm for LEO satellite networks", Date of Conference: Aug. 8-12, 2005, 6 pgs.
Dr. Dirk Giggenbach et al., "A High-Throughput Satellite System for Serving whole Europe with Fast Internet Service, Employing Optical Feeder Links", published Apr. 21, 2015, 8 pgs.
B.G. Evans, Satellite Communication Systems, 3rd edition, p. 450, first published 1999.
Extended European Search Report, dated Nov. 21, 2017, in corresponding European patent application No. 17179803.6; 11 pgs.
ETSI, Digital Video Broadcasting (DVB) Part 1 DVB S2, Jul. 2014, European Standard, All Document. (Year: 2014).
Poulenard et al, Optical links sizing for broadband geostationary satellite feeder link, Mar. 2016, SPIE, All Document. (Year: 2016).
Dimitrov et al, Digital Modulation and Coding for Satellite Optical Feeder Links, Oct. 2014, IEEE, All Document. (Year: 2014).

* cited by examiner

METHOD FOR TRANSMITTING A BINARY DATA SIGNAL TO OR FROM A SATELLITE VIA AN OPTICAL FEEDER LINK

FIELD OF THE INVENTION

The present invention relates to a method for transmitting a binary data signal to or from a satellite via an optical feeder link.

BACKGROUND OF THE INVENTION

Description of Related Art

In the forward link of a satellite a gateway transfers data signals to the users using a satellite. Such a scenario is illustrated in FIG. 1.

Such systems as well as corresponding transmitting methods are illustrated in the following publications:

[1] "ICT-2011.1.1 BATS D4.1: Satellite Network Mission Requirements", Broadband Access via Integrated Terrestrial and Satellite Systems (BATS) European Project, Tech. Rep., 2012.

[2] "Optimised Smart Gateway Diversity for BATS", Broadband Access via Integrated Terrestrial and Satellite Systems (BATS) European Project, BATS Factsheet 8, May 2014.

[3] Second Generation Framing Structure, Channel Coding and Modulation Systems for Broadcasting, Interactive Services, News Gathering and Other Broadband Satellite Applications; Part II: S2-Extensions (DVBS2X), Digital Video Broadcasting 30 (DVB) Std. ETSI EN 302 307-2, October 2014.

[4] Implementation Guidelines for the Second Generation System for Broadcasting, Interactive Services, News Gathering and Other Broadband Satellite Applications; Part II: S2-Extensions (DVB-S2X), Digital Video Broadcasting (DVB) Std. ETSI TR 102 376-2, March 2015.

A satellite system known from prior art, such as that described in publication 1, comprises a number of gateways $N_{gw}$ which serve a number of spot beams. In the case of a large number of spot beams (up to 151 spot beams per satellite as per publication [2], for example) a large number of gateways (up to 29 gateways, see publication [2]) is required in the radio frequency (RF) V-band, for example, due to the limitation of the spectrum in the feeder link.

The setup of the transmitting system in the feeder link, as is known from prior art, is illustrated in FIG. 2. In the forward link standard DVB-S2X as per publication 3 one or a plurality of carriers are associated with a user beam. For example, in the broadband multicarrier reference scenario, which is specified in publication 4, three carriers of approximately 500 MHz each are associated with a user beam. This results in a 1.5-GHz spectrum per user beam, as is illustrated in FIG. 3. Each carrier is modulated by a pulse-shaped stream of super frames which consist of bunched physical layer frames. Taking into consideration the RF-V-band which is used in the feeder link, only two beams can be accommodated in the spectrum, which results in a strong increase in the number of required gateways.

Each carrier bit stream is framed in physical layer frames. After a modulation using amplitude and phase shift keying (APSK) and pulse shaping by a square root raised cosine filter (SRRCF) up to three DVB-S2X carriers per beam are multiplexed. After an upward conversion to the carrier frequency in the RF-V-band the signal is amplified by a high-performance amplifier and transmitted via the gateway antenna.

In the satellite the signal is received by the feeder link antenna. The beam currents are filtered, amplified and frequency-converted to the carrier frequency in the user link in the RF Ka-band using $N_T$ transponders. The signal is then transferred to the $N_U$ user terminals by the user link antenna.

The return link carries out the reverse operation and the return feeder link is associated with the RF Q-band.

SUMMARY OF THE INVENTION

It is an object of the present invention to provide a method for transmitting a data signal to or from a satellite, wherein a lower number of gateways is required. Further, a method for receiving and processing a binary data signal in the satellite communication is to be provided.

In the method according to the present invention a binary data signal is transmitted to or from a satellite via an optical feeder link. For this purpose the following steps are carried out in an optical transmitting interface:

multiplexing binary physical layer frames which are associated with one of a plurality of carriers and a plurality of beams in the satellite communication system into a single bit stream, inserting a binary physical layer frame identification sequence upstream of each physical layer frame, wherein the physical layer frame identification sequence comprises:
- a unique binary synchronization sequence,
- a binary beam index sequence,
- a binary carrier frequency index sequence,
- a binary baud rate index sequence,
- a binary roll-off factor index sequence,
- a binary modulation index sequence.

The method according to the present invention is used in the feeder link of a satellite, wherein the data communication can take place either towards the satellite or vice versa. This means that either the satellite can be the transmitter and the gateway can be the receiver or vice versa. On both sides of the transmission path an optical interface is located, namely on the one hand an optical transmitting interface which has already been described and on the other hand an optical receiver interface which will be described in detail below. Preferably, this interface is arranged downstream of the framing block where the bitwise representation of the physical layer frames is generated in each carrier per beam. In order to obtain the information concerning the structure of the underlying carrier bit stream and further maintain a proper association of the physical layer frames to the carriers and beams the described physical layer frame identification sequence is used.

The length of the stated bit sequences can be selected such that enough bits are available for transmitting the required information.

In a preferred embodiment, at least some sequences of the physical layer frame identification sequence comprise redundancy bits in order to be less susceptible to sporadic interferences on the transmission channel.

In a further preferred embodiment, the optical transmitting interface comprises a data buffer for storing the binary bit stream of the physical layer frame to compensate for differences in the baud rate of the carriers.

Preferably, the physical layer frames remain unchanged such that the method remains open to future modifications of the DVB-S2X transmission standards.

It is further preferred that the binary data stream is used at the output of the optical transmitting interface for modulating an optical carrier, for example a laser. The optical carriers are then associated with a dense wavelength division multiplexing (DWDM) grid. Depending on the magnitude of the selected DWDM grid a number of beams (N beams) can be associated with the DWDM channel.

For example, the DWDM-multiplexed optical signal is amplified by an erbium-doped fiber amplifier (EDFA) and transmitted via the feeder link using the optical telescope transmitter.

Preferably, a coherent modulation, in particular an amplitude or phase modulation, is used for modulating the optical carrier signal.

Alternatively, an incoherent intensity modulation, in particular a pulse amplitude or pulse position modulation, can be used for modulating the optical carrier signal.

The present invention further relates to a method for receiving and processing a binary data signal which is transmitted to or from a satellite via an optical feeder link. The transmission can take place according to the method described above. An optical receiving interface carries out the following steps:
  synchronizing the binary data stream using the unique binary synchronization sequence,
  extracting the corresponding physical layer frames.

On the satellite side the optical signal is thus received by a receiving telescope. The signal can again be amplified by an EDFA. Downstream of a DWDM demultiplexer each optical carrier in the DWDM channel can be demodulated by a photodiode and a demodulator for restoring the digital bit stream.

In addition, any redundancy bits in the physical layer frame identification sequence can be removed.

Since the physical layer data stream comprises a structure in which each physical layer frame identifier is followed by a physical layer frame, the frames which are associated with a DVB-S2X carrier can be restored from this data stream. The unique synchronization bit sequence allows for extraction of the physical layer frames. They are then modulated according to the modulation format which is given in the physical layer frame identifier without the physical layer header having to be decoded.

Preferably, the physical layer frames are modulated and processed by pulse shaping to produce a carrier signal according to the modulation index, the roll-off factor index and the baud rate index in the physical layer frame identification sequence.

The DVB-S2X carriers can subsequently be multiplexed and upward converted according to the carrier frequency index and the beam index in the physical layer frame identification sequence. For instance, the upward conversion can be performed to a frequency which is used in the user link, for example the Ka-band.

The beam signals can then be filtered and amplified to be then sent to the user via the user link.

On both sides of the transmission path the optical interfaces can be implemented by FPGA modules.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS OF THE INVENTION

Figure 1:
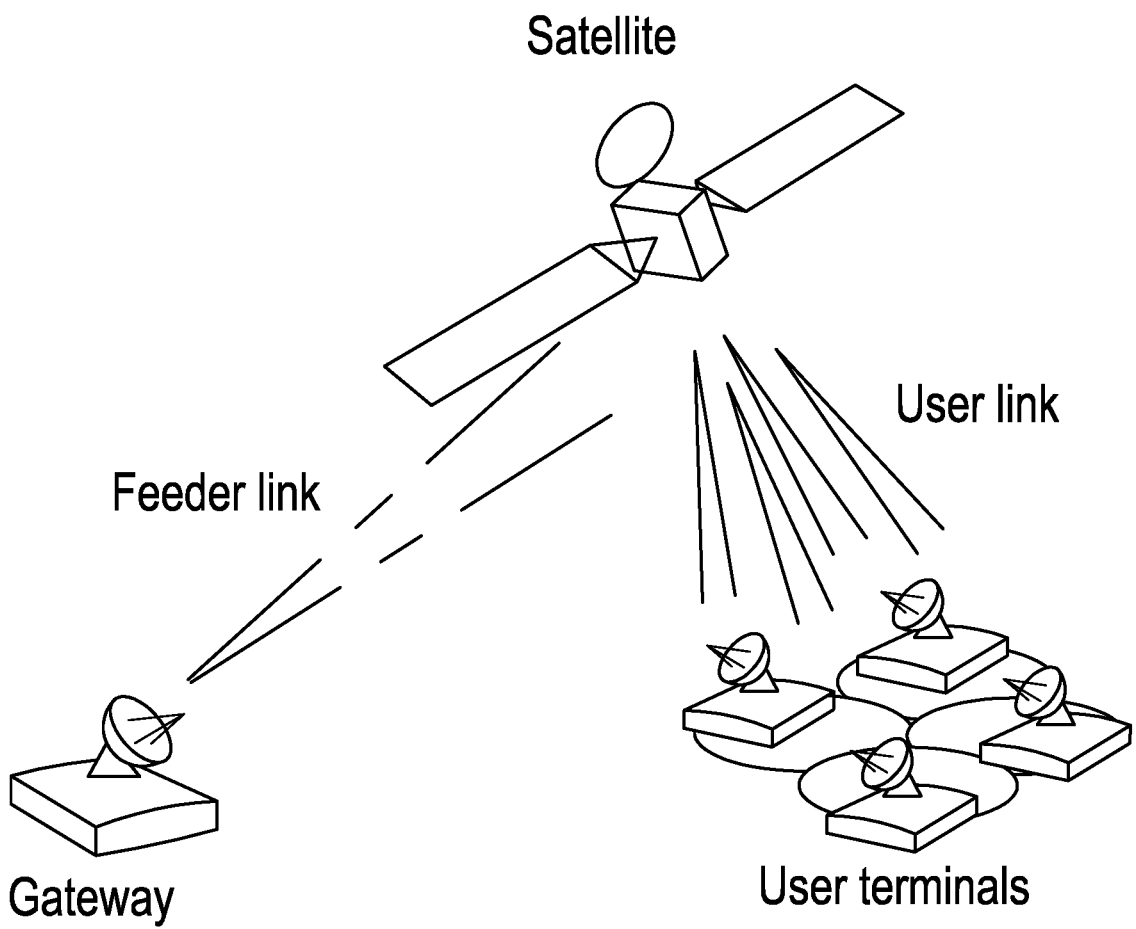
FIG. 1 shows a schematic representation of a forward link in the satellite communication.
Figure 2:
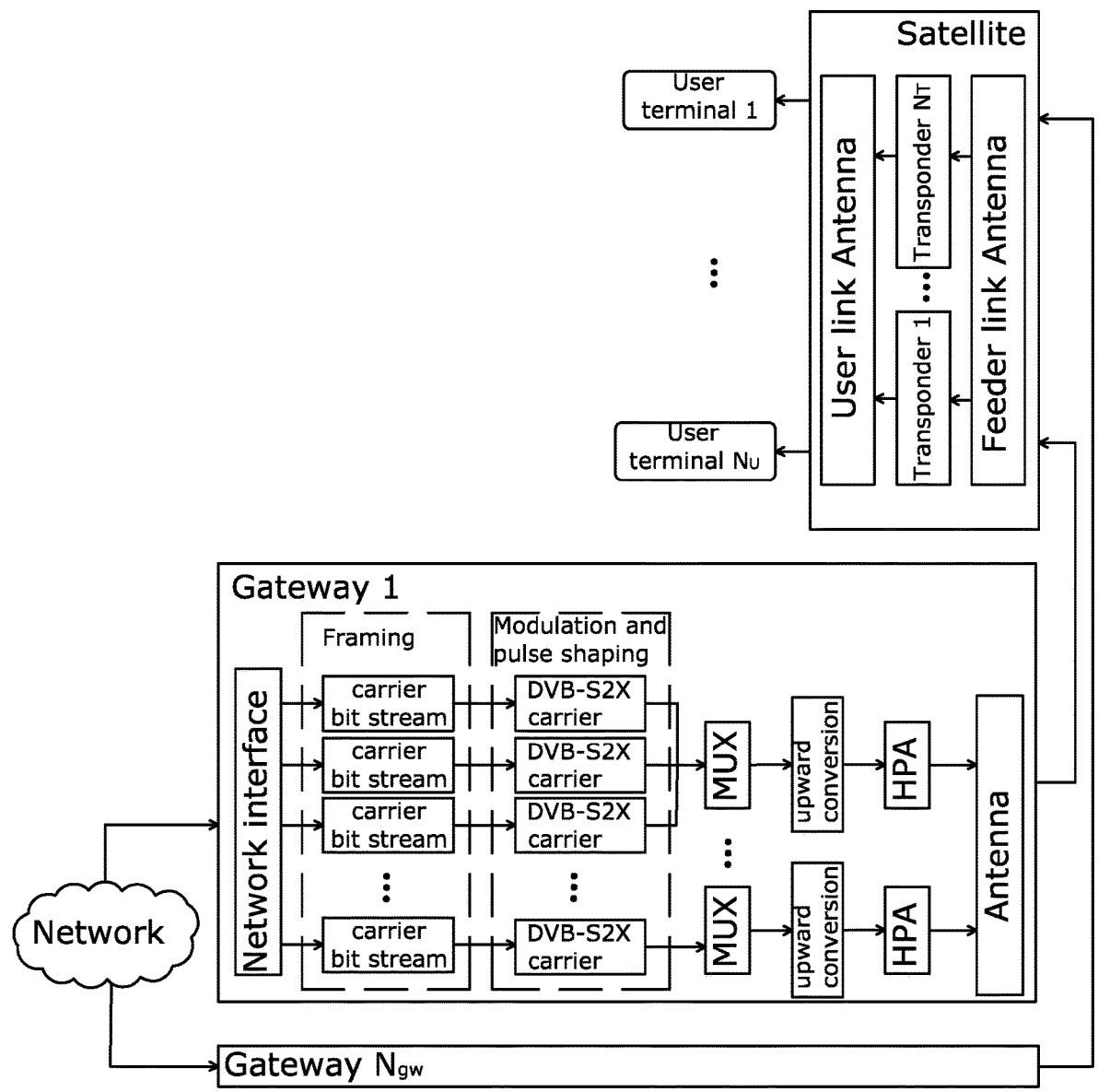
FIG. 2 shows the transmission chain of a satellite forward link according to prior art.
Figure 3:
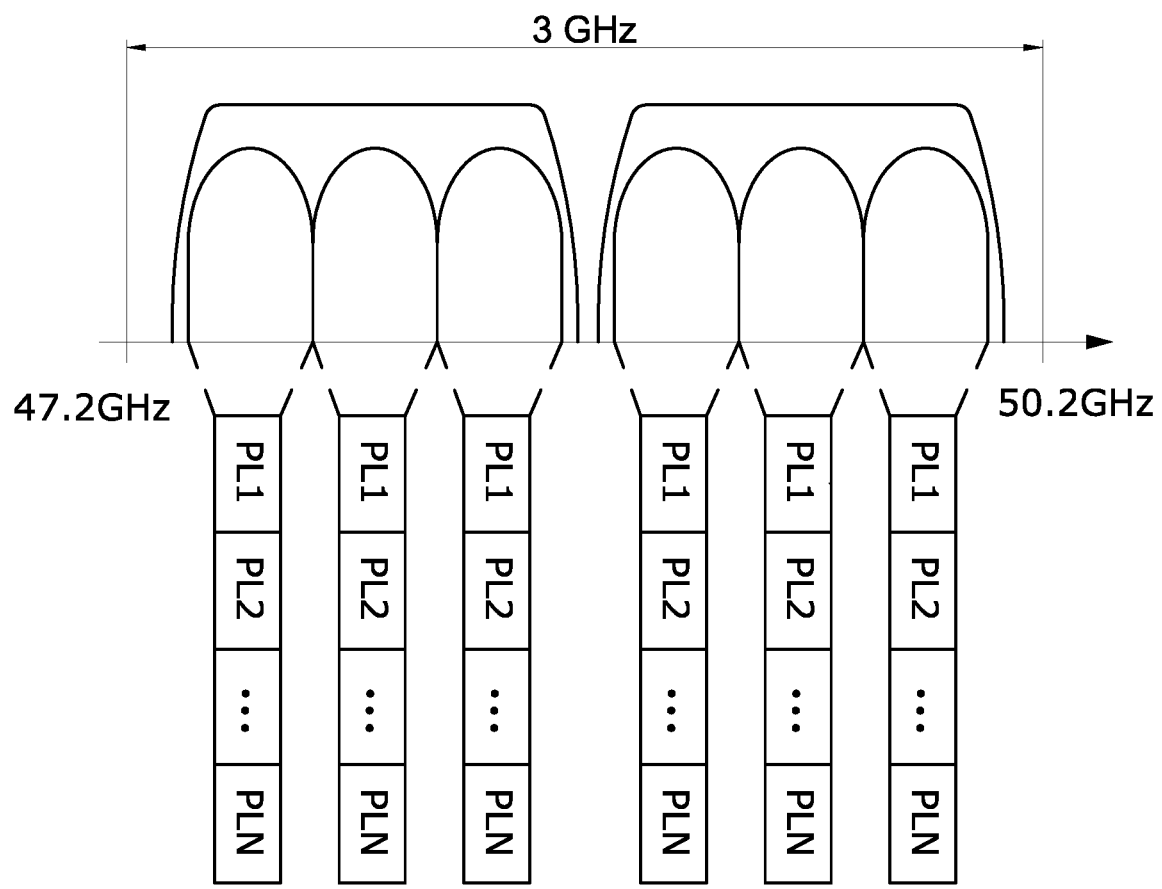
FIG. 3 shows the association in the carrier spectrum in the RF V-band according to prior art.

FIGS. 1 to 3 have already been elucidated in the context of prior art.

Figure 4:
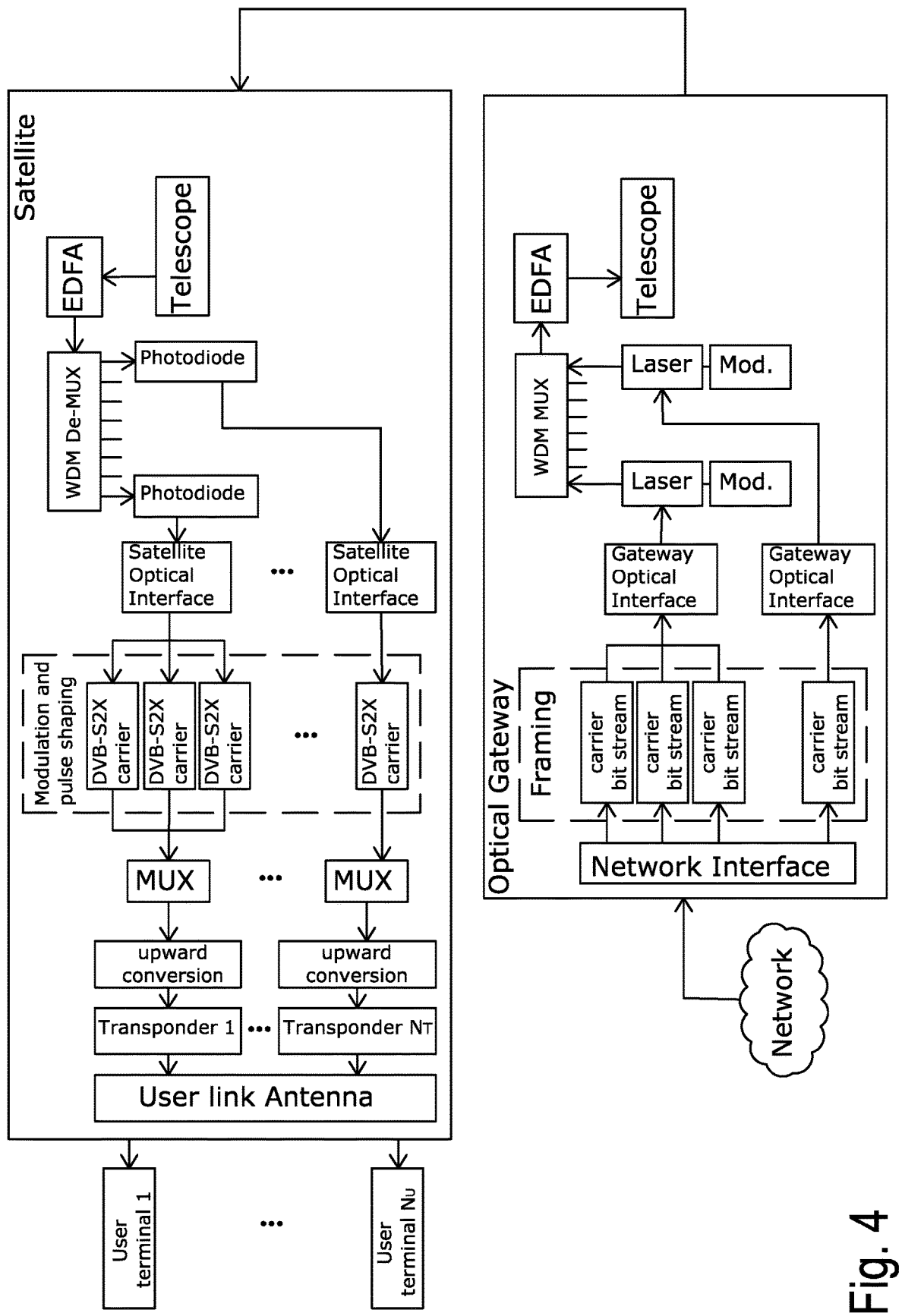
FIG. 4 shows an embodiment of the transmission chain according to the present invention.

In FIG. 4 an embodiment of the optical transmission chain of the method according to the present invention is illustrated. The data coming from a network are supplied to a framing block via a network interface. The binary data stream at the output of the optical gateway interfaces is used for modulating an optical carrier signal of a laser in a DWDM channel. After the multiplexing and amplification the signal is supplied to the telescope and sent via the transmission channel.

On the receiving side a processing of the signal takes place in a reverse order, as has already been illustrated in the present application. This is shown in the upper part of FIG. 2.

Figure 5:
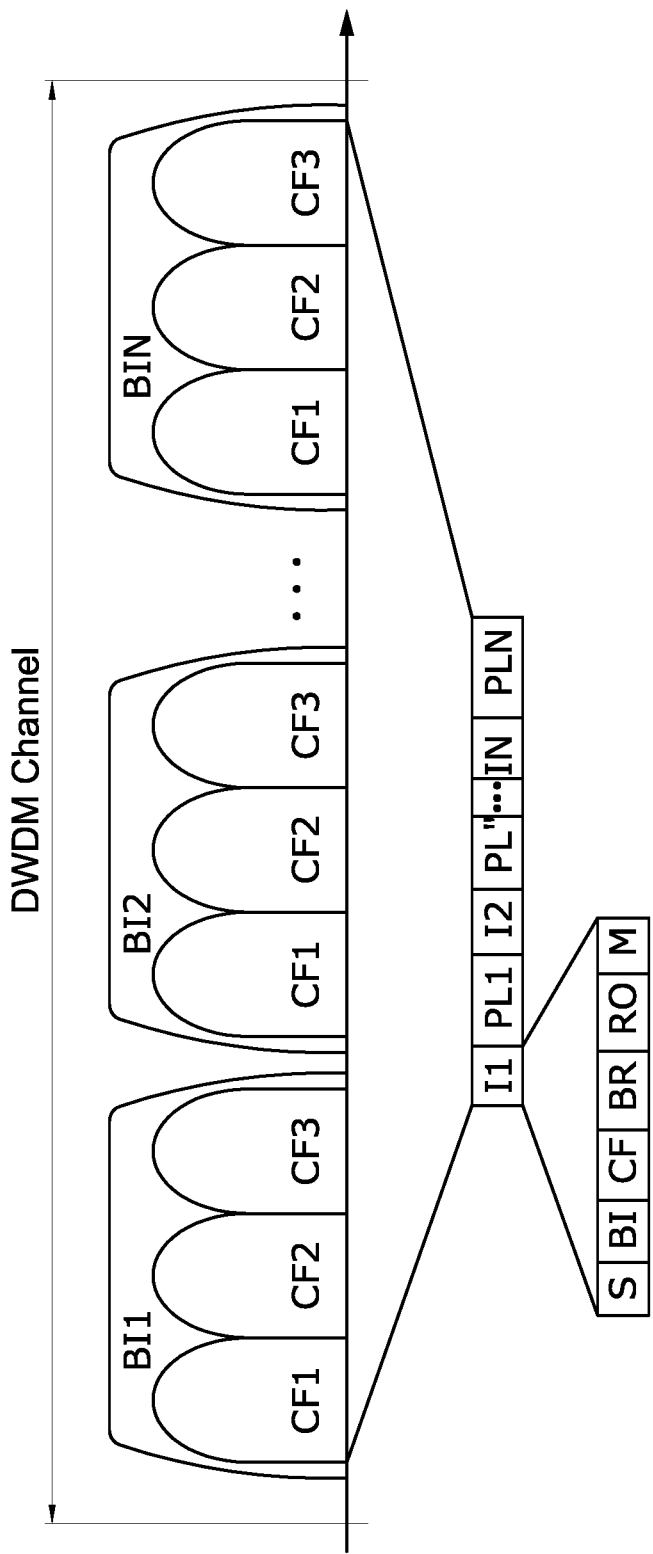
FIG. 5 shows the association of the beams in a DWDM channel in a method according to the present invention.

The association of the beams in a DWDM channel in the form of a multiplexed physical layer bit stream is illustrated in FIG. 5. The representation includes the physical layer frame identification sequence I1 to IN which is arranged upstream of each physical layer frame. This sequence includes the following information:
  a unique binary synchronization sequence (S),
  a binary beam index sequence (BI),
  a binary carrier frequency index sequence (CF),
  a binary baud rate index sequence (BR),
  a binary roll-off factor index sequence (RO),
  a binary modulation index sequence (M).

The length of the stated fields is system-specific, wherein this information should be present at the receiver end. The synchronization sequence (S) can comprise any length which is sufficient to allow for a reliable identification of the start of the physical layer frame identification sequence. For example, this can be realized by a correlation with the known sequence at the receiver. An example of a synchronization sequence in which a 32-bit synchronization word is used is illustrated hereunder:

11110011001110110111110010001111

The next field identifies which beam is associated with the physical layer frame. In a system having 150 beams, as described in the case shown in FIGS. 1 and 2, for example, 8 bits are sufficient for representing this information. An example of the BI field for beam 67 using a decimal-to-binary conversion is as follows:

01000011

Depending on the number of carriers which are associated with a beam the length of the carrier frequency field is defined. In a system having three carriers per beam, as is described in publications 1 to 4, for example, 2 bits are sufficient. An example of the CF field of the second carrier using a decimal-to-binary conversion is as follows:

10

Since the baud rate may be variable a 64-bit double-precision floating-point number is used in the BR field.

An example of a 425 Msps carrier is:
0100000110111001010101001111111000100000000000
0000000000000000000

In addition to the baud rate the roll-off factor of the carrier in the RO field is given. For a system having six different options for roll-off factors (as per publications [3] and [4] 5%, 10%, 15%, 20%, 25% and 35%) 3 bits are sufficient for giving the stated information in the RO field. When the roll-off factors are used in the stated order an exemplary roll-off factor of 20% using a decimal-to-binary conversion would be:
100

Finally, the MODCOD index is given in the M field. Proceeding from the 12 MOD-CODs which are specified in DVB-S2X (see publications [3] and [4]) 7 bits are sufficient for including this information. An example of the MOD-COD with index 45 using a decimal-to-binary conversion is:
0101101

As a result the overall bit number in the physical layer frame identifier is 116 bits. Proceeding from a length of a short physical layer frame of 16,200 symbols an overhead of 0.72% is achieved which is thus negligible.

According to the definition of the physical layer frame identifier the composition of the bit stream to be transmitted is observed across the optical feeder link. A satellite having a high throughput can serve up to 150 user beams (see publication [2]). The data traffic in each beam is associated with three carriers having a symbol rate of 425 Msps, for example, which results in an overall symbol rate of 1275 Msps per beam. Using the MODCOD with the highest modulation order and the highest coding overhead, for example 256 APSK having a code rate of 29/45, a maximum bit rate of approximately 15.8 Gbps per beam can be achieved using a 0.4 nm DWDM grid. With 50-GHz channels the data traffic for three beams can be multiplexed. The multiplexed bit stream is modulated on the optical carrier (the laser) using a coherent QPSK modulation. The resultant optical signal is supplied to a DWDM channel.

The required overall bandwidth for all 150 beams thus amounts to (0.4×150/3) nm=20 nm. As a result the overall data traffic in the forward feeder link can be readily arranged within the optical L-band between 1,565 nm and 1,625 nm such that merely a single optical gateway is required. This is a significant reduction as compared with the 29 RF Q/V-band gateways which are required as per publication 2.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for receiving and processing a binary data signal which is transmitted to or from a satellite via an optical feeder link, wherein an optical receiving interface carries out the following steps comprising:
   synchronizing the binary data signal using an unique binary synchronization sequence; and
   extracting corresponding physical layer frames,
   wherein a physical layer frame identification sequence is arranged upstream of at least one of the physical layer frames,
   wherein the physical layer frame identification sequence comprises at least one beam index sequence and at least one carrier frequency index sequence,
   wherein the at least one beam index sequence is associated with the at least one carrier frequency index sequence corresponding to a plurality of carriers, and
   wherein the binary data signal is transmitted as a single bit stream via a single optical gateway by using the single bit stream at an output of an optical transmitting interface for modulating an optical carrier of a laser in a dense wavelength division multiplexing (DWDM) channel.

2. The method according to claim 1, wherein an additional step is provided:
   removing redundancy bits in the physical layer frame identification sequence.

3. The method according to claim 1, wherein the each optical carrier in the DWDM channel is demodulated by a photodiode and a demodulator for restoring a digital bit stream.

4. The method according to claim 1, wherein the physical layer frames are modulated and processed by pulse shaping for producing a carrier signal, according to a modulation index, a roll-off factor index and a baud rate index in the physical layer frame identification sequence.

5. The method according to claim 1, wherein the carriers are multiplexed and upward converted according to the carrier frequency index and the beam index in the physical layer frame identification sequence.

* * * * *